United States Patent [19]

Garrish

[11] Patent Number: 4,873,028
[45] Date of Patent: Oct. 10, 1989

[54] LOW SILHOUETTE COOLING TOWER WITH TRAPEZOIDAL FILL AND METHOD OF AIR FLOW THERETHROUGH

[75] Inventor: Bryan F. Garrish, Ellicott City, Md.

[73] Assignee: Baltimore Aircoil Company, Inc., Jessup, Md.

[21] Appl. No.: 158,603

[22] Filed: Feb. 22, 1988

[51] Int. Cl.$^4$ .......................... B01F 3/04; F28C 1/02
[52] U.S. Cl. .................... 261/109; 261/30; 261/112.1; 261/153; 261/DIG. 11
[58] Field of Search .............. 261/109, 111, 112.1, 261/112.2, 30, 153, DIG. 11; 165/900

[56] References Cited

U.S. PATENT DOCUMENTS

| | | | |
|---|---|---|---|
| 2,809,818 | 10/1957 | Munters | 261/112.2 X |
| 2,915,302 | 12/1959 | Jacir | 261/30 |
| 3,132,190 | 5/1964 | Engalitcheff, Jr. | 261/30 |
| 3,265,550 | 8/1966 | Lindqvist | 261/112.2 X |
| 3,395,903 | 8/1968 | Norback et al. | 261/112.2 |
| 3,500,615 | 3/1970 | Meek | 261/112.2 X |
| 3,754,738 | 8/1973 | Blazer et al. | 261/DIG. 11 |
| 3,903,212 | 9/1975 | Lefevre | 261/DIG. 11 |
| 3,917,764 | 11/1975 | Phelps | 261/DIG. 11 |
| 3,983,190 | 9/1976 | Norback | 261/111 |
| 4,530,804 | 7/1985 | Cates et al. | 261/30 |
| 4,548,766 | 10/1985 | Kinney, Jr. et al. | 261/DIG. 11 |

FOREIGN PATENT DOCUMENTS 321402 6/1920 Fed. Rep. of Germany ... 261/DIG. 11

Primary Examiner—Richard L. Chiesa
Attorney, Agent, or Firm—Charles E. Bouton; Edward J. Brosius

[57] ABSTRACT

The vertical height requirement of a cooling tower is reduced by utilizing trapezoidal shaped fill sheets which are suspended generally in line with the entering air stream so as to form a wedge shaped plenum space beneath the lower sloped edges of the fill sheets. This enables a method of lengthening the vertical air paths through the media as distance from entry is increased thereby promoting vertical air flow near the entry.

10 Claims, 3 Drawing Sheets

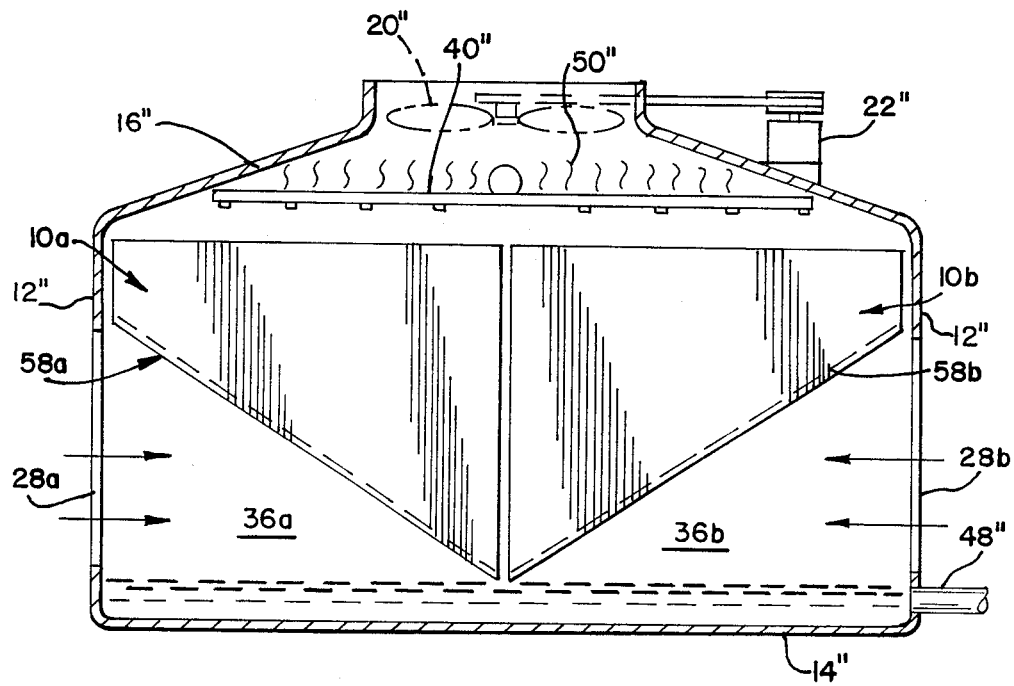
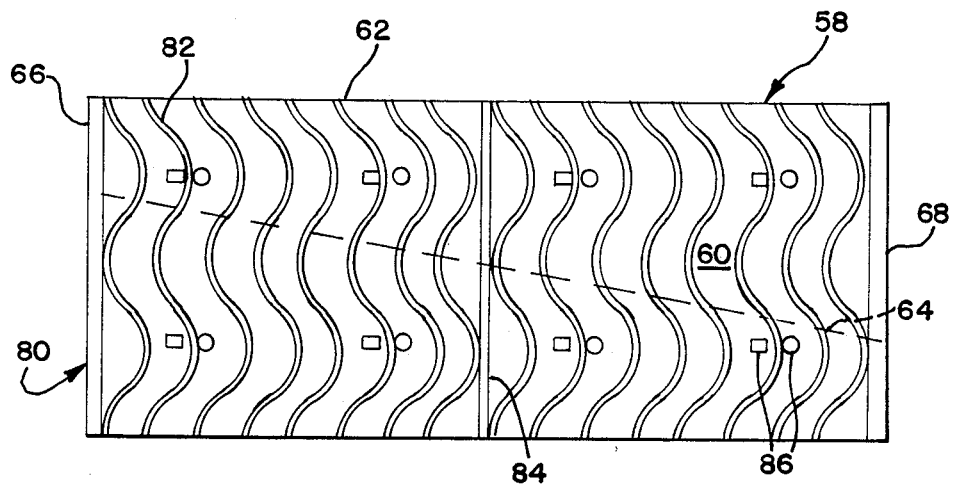

LOW SILHOUETTE COOLING TOWER WITH TRAPEZOIDAL FILL AND METHOD OF AIR FLOW THERETHROUGH

BACKGROUND OF THE INVENTION

This invention relates to cooling towers wherein heat is exchanged between water and air, and more particularly involves an improved counterflow cooling tower with heat transfer media construction and method of operation which enables the vertical dimension of the cooling tower to be reduced and improves airflow through the media.

The design of counterflow cooling towers is a well developed technology. In one style of counterflow cooling tower which is widely applied in commercial installations heat transfer media comprising a plurality of fill sheets are mounted vertically and slightly spaced so as to provide vertical air channels between adjacent sheets, and ambient air is passed upwardly while heated water is flowed downwardly on the surface of the sheets to effect heat exchange to cool the water. The fill sheets have been relatively flat parallelograms, usually rectangles, of relatively impervious material with surface embossments to keep adjacent sheets spaced apart and to distribute a film of water on each surface. Such sheets have been arrayed in a horizontal bank with the lower edges positioned horizontally and held generally parallel and even with one another at a uniform distance above a water sump or pool in the bottom of the cooling tower so as to provide a rectangular plenum for air to enter beneath the fill sheets, as shown, for example, in U.S. Pat. No. 3,132,190 to Engalitcheff Jr. Above the bank of fill sheets a water distribution network is located and balanced so as to deliver substantially uniform rates of water flow to all portions of the fill sheets; and above that an air outlet is located.

Rarely do counterflow heat exchangers depart from such an arrangement, although there has been a design for such a unit wherein a pack of multiple fill units is shaped to form a sloping bank of interconnected uniform symmetrical fill sheets arranged with the sheets perpendicular to the entering air flow, as shown in U.S. Pat. No. 3,983,190 to Norback.

It is to be understood that other types of heat transfer media may be employed in a cooling tower, such as serpentine or coiled tubing wherein another fluid is circulated, and combinations of fill sheets and tubing. The present invention is also applicable to such other heat transfer media which is referred to herein collectively as media.

While it is sometimes possible to provide for a natural air draft through such a counterflow cooling tower, it is far more common that air is propelled mechanically. This may be by either forced draft, where one or more fans drive air from one or more sides of the cooling tower into the plenum below the fill sheets, or induced draft, where one or more fans are mounted above the fill sheets and water distributor and draw air through the plenum and media. In all such instances the air enters the plenum horizontally and therein gradually turns upwardly to pass between the media.

A number of factors such as fan shrouding, the dynamics of air flow through the fan, and distance from the air inlet contribute to an uneven distribution of air flowing between the media. In the past this has usually been compensated by maximizing the vertical dimension and space within the plenum, orienting the lowermost media to be perpendicular to the initial horizontal direction of air entering the cooling tower and/or sometimes positioning control vanes within the plenum. Even so in prior cooling towers the air entering the plenum has tended to move horizontally beyond the media adjacent the air entry resulting in an area of media close to the entry way that is relatively starved for vertically moving air and a consequent reduction in efficiency. This has been particularly true of forced draft towers employing centrifugal fans which heretofore tended to thrust air with great force toward a far side of the plenum.

Moreover, it has been found that the overall height of a cooling tower is limited by practical considerations such as the need to reduce risk of wind damage, vertical structural restraints and restrictions at the location of installation (space between floors and maximum height for buildings) and the visual impact of a cooling tower respecting its surroundings. Another important factor applies to factory constructed cooling towers which are shipped from a manufacturing plant to an installation site along rail lines and roadways with vertical limits imposed by either the carrier equipment or bridges, and the like, along the route.

SUMMARY OF THE INVENTION

Accordingly, it is a primary object of the present invention to devise a counterflow cooling tower with a relatively smaller vertical height.

It is also an object of the present invention to devise a counterflow cooling tower and method of operation with a more efficient distribution of air flow through all areas of the media contained therein.

It is another object of the present invention to provide a counterflow cooling tower with a relatively smaller inlet air plenum and non-symmetrical heat transfer media whereby the height of the cooling tower may be reduced and air distributed more effectively to all areas of the media.

It is a further object of the present invention to provide a counterflow cooling tower with non-rectangular heat transfer media and air plenum which interface along a sloped boundary whereby the height of the cooling tower may be reduced and air distributed more effectively to all area of the media.

It is still another object of the present invention to facilitate the air movement through a counter flow cooling tower by aligning heat transfer media with the incoming air flow and positioning the lower edges of the media at an angle to the horizontal and direction of the incoming air flow.

An even further object of the present invention is to provide a method for moving air into a cooling tower and more effectively redirecting the air through heat transfer media therein.

It is yet another object of the present invention to provide an improved trapezoidal shaped fill sheet to permit a reduction in the vertical dimension of a cooling tower.

Briefly the present invention allows for a reduction in the overall height of a counterflow cooling tower by organizing heat transfer media in a non symmetrical arrangement therein so that a lower boundary of the media is inclined downwardly toward the bottom of the tower from an air entry side toward a far side of the cooling tower, so as to form a sloped interface with a triangular air plenum from which the horizontally entering air tends to move substantially upwardly upon reaching the media.

Stated differently, the present invention provides for arranging the media within a cooling tower to slope downwardly from an air entryway and thereby obstructing incremental layers of air moving horizontally into the plenum below the media and turning the incremental air flow upwardly as each layer reaches media interfacing the plenum.

A preferred form of media is fill sheets of trapezoidal shape suspended so as to be parallel to the direction of entering air flow.

BRIEF DESCRIPTION OF THE DRAWINGS

Other objects and advantages of the present invention will become apparent upon reading the following detailed description in conjunction with the drawings wherein:

FIG. 4 is an illustrative side elevation of an induced draft counterflow cooling tower having symmetrical construction with air entry from the opposite sides; and FIG. 5 is a view of rectangular fill sheet stock, marked for cutting to produce two trapezoidal fill sheets of the present invention.

DETAILED DESCRIPTION OF THE INVENTION

Figure 1:
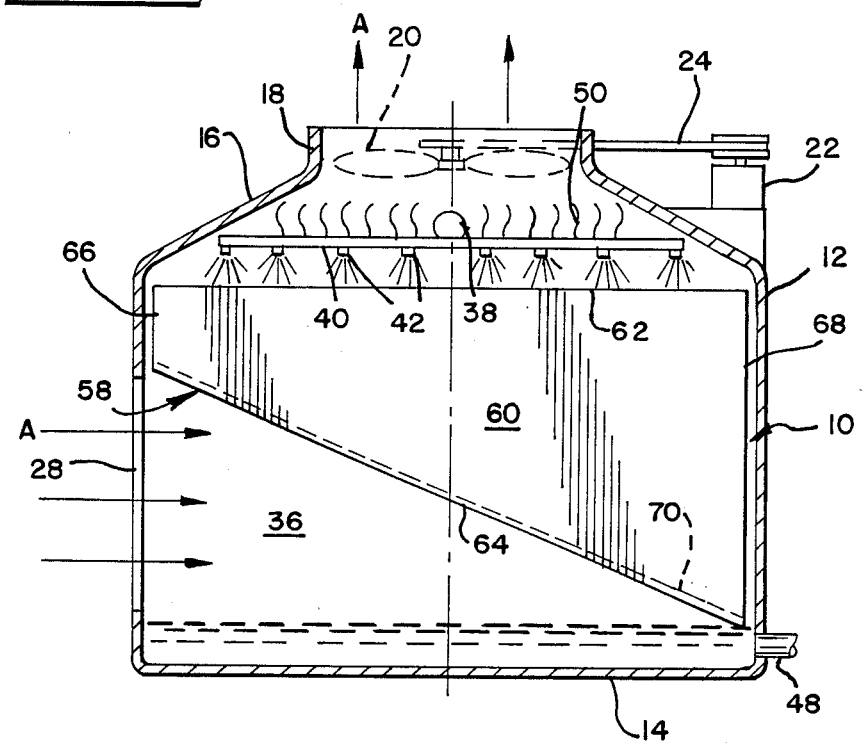
FIG. 1 is an illustrative side elevation of an induced draft counterflow cooling tower embodying the present invention and containing trapezoidal fill sheets, with an end removed to show interior parts.

An induced draft counterflow cooling tower is illustrated in FIG. 1 wherein a plurality of heat transfer media generally 10 are suspended within a generally rectangular enclosure comprising vertical walls 12, a bottom basin 14 (or sump) and an overhead cowling 16 shaped to form a transition cover extending from the walls 12 to an exhaust fan ring 18 which surrounds and supports a multibladed fan 20 driven by an electric motor 22. Normally the motor 22 is mounted on the exterior of the cooling tower so as to be clear of the highly humid air discharged therefrom; however the motor 22 may be located within the tower or above the fan discharge. As illustrated the motor 22 is supported on the cowling 16 and is drivingly connected to the fan 20 by an endless belt 24, or the like, extending between sheaves on the motor shaft and fan shaft.

As shown by the arrows A in FIG. 1, air is drawn horizontally through an entry way 28 in only one side wall into a plenum space 36 within the cooling tower and moves upwardly between the media 10 and exits through the fan ring 18. The bottom of the cooling tower comprises an enclosed basin or sump 14 to receive a descending flow of water that is sprayed on the media 10 from an overhead distribution network comprising a water main 38, distribution pipes 40 and spray nozzles 42. Water is discharged from the basin 14 through a discharge conduit 48. A plurality of mist eliminator baffles 50 is positioned above the media 10 and may be conveniently supported above the water distribution pipes 40.

A preferred form of media 10 in the present invention is non-rectangular fill sheets 58 having trapezoid shaped faces 60 which sheets are suspended in the cooling tower so as to have a horizontal upper edge 62 and a sloped, non-parallel lower edge 64 which extends from a short side edge 66 downwardly, to an opposite parallel and longer side edge 68. A plurality of such fill sheets 58 are suspended within the cooling tower with the short side edges 66 disposed toward an air entry side so that the lower edges 64 decline away from the top of an air entry way 28 toward the basin 14 thereby forming a sloped boundary and interface respecting the plenum space 36.

Thus it will also be understood that the present invention involves a novel method of operation by orienting the interface between heat transfer media and air plenum to slope downwardly from the top of the air entrance side of a cooling tower and thereby resisting continued horizontal movement of increments or layers of air and turning such increments of air to move upwardly through the media. Further the present method involves increasing the depth of the media as the distance from the air entrance increases (by maintaining the media top substantially at a horizontal level) thereby progressively lengthening both the horizontal and vertical air paths and hence increasing the flow resistance for successive increments or layers of air entering the cooling tower. This results in a relatively greater amount of air flow upwardly at the air entrance to the cooling tower as compared to towers having a horizontal interface between media and plenum and an even depth of media across the tower.

It is to be noted that the fill sheets 58 are oriented to position the faces 60 parallel to the entering air flow (as designated by the arrows "A"). In the illustrated embodiment there are a plurality of substantially identical parallel fill sheets 58 (only one such sheet being visible from the side) each extending the full vertical depth of the media. This parallel arrangement results in a uniform media density. It is to be understood, however, that such media may be constructed of stacked layers (not shown) wherein the upper layer (or layers) may comprise rectangular sheet components arranged vertically, and either parallel or crosswise to the lowermost fill sheets, so long as the latter present a sloping interface with the air plenum 36. Preferably the sloping interface is obtained by employing non-rectangular fill sheets and orienting a diverging edge 64 downwardly across the plenum 36, and while trapezoidal sheets 60 as shown are preferred, it is possible to utilize a triangular fill sheet (not shown).

Preferably the mist eliminator baffles 50 are mounted crosswise to the fill sheets (as shown) so as to function to both deflect and guide discharge air away from the intake air space and collect air entrained moisture droplets. However, baffles 50 may be repositioned if air is to be deflected in a different direction. The water distribution spray nozzles 42 may be adjusted to supply relatively lesser quantities of water adjacent the fill sheet short side edges 66 as compared to the longer side edges 68 to partially balance the effect of the relative cooling paths of increments of water descending along the fill sheet faces 60 when appropriate to fill height and density conditions. However, that effect is also at least partially balanced by a relatively lower resistance to air flow, and hence greater rate of air flow, across the shorter cooling paths.

Because the preferred fill sheets have sloped lower edges 64 there is a tendency for some of the descending water to temporarily collect in the form of beads which run down the lower edge rather than to drop into the plenum space 36. In excessive amounts and circumstances such beading on adjacent fill sheets could bridge the space between sheets and interfere with air flow distribution. To counteract such a possibility the lower edges 64 of interdigitating fill sheets are alternately offset a small vertical distance (as shown by a phantom line 70 in FIG. 1.

Further details of fill sheets generally 10 are shown in FIG. 5 which also illustrates the method by which such sheets with trapezoidal faces 60 are made. Formed rectangular stock 80 of plastic film is available as the usual type of rectangular fill sheet in a wide range of dimensions. Such stock usually is embossed with a uniform pattern of contours 82, which define pathways and generally increase the surface area across which water is spread in the cooling tower, and one or more stiffening ridges 84 and margins. Also the stock is embossed to include a plurality of spacer projections 86 extending in two directions perpendicular to the plane of the sheet which projections nest when the sheets are stacked but serve to keep adjacent sheets spaced apart when suspended in a cooling tower in an offset interdigatating manner. The rectangular stock 80 is cut at an angle, as shown by the dashed line in FIG. 5, between points on opposite sides equally spaced from the longer edges thereof. The specific dimensions and the slope angle of the non-parallel edge may be adapted to the size limitations of a cooling tower.

Figure 2:
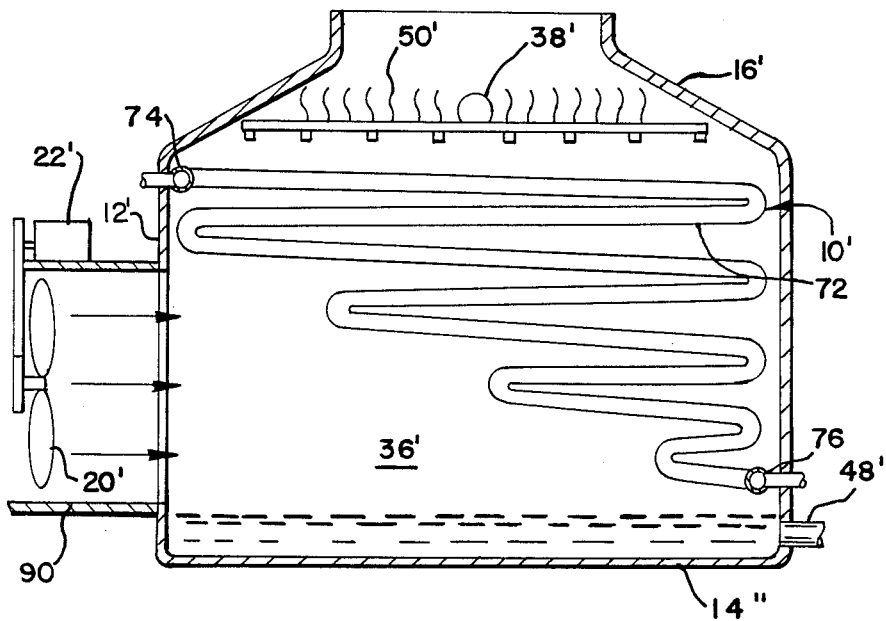
FIG. 2 is an illustrative side elevation, similar to FIG. 1, showing a forced draft counterflow cooling tower embodying the present invention and containing serpentine tube media.

In a forced draft embodiment shown in FIG. 2 structural elements corresponding to those heretofore described are denominated by the same reference character with a prime notation. It will be seen that in this embodiment an air duct 90 extends outwardly from one cooling tower wall 12' and a fan 20' is mounted to force air through the duct 90 into the plenum space 36'. In this embodiment the heat transfer media is shown to comprise parallel rows of serpentine tubes 72 connected between inlet and outlet headers 74 and 76, respectively, and aligned with the incoming air. This type of media permits an additional fluid to be cooled as it is flowed through the serpentine tubes. It will be noted that each successive descending run of the serpentine tube 72 is shortened so as to define a sloping interface with the plenum 36'.

Figure 3:
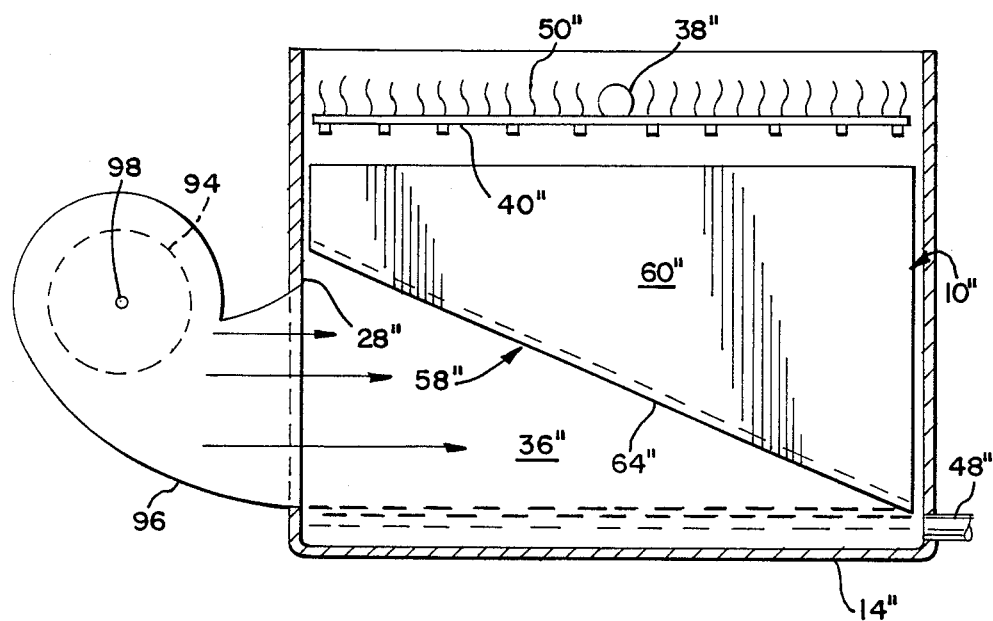
FIG. 3 is an illustrative side elevation of a preferred embodiment of the present invention comprising a forced draft counterflow cooling tower with a centrifugal fan and trapezoidal fill sheets.

FIG. 3 illustrates a preferred embodiment of the present invention utilizing trapezoidal fill sheets 58'' in a forced draft counterflow cooling tower having a centrifugal fan 94. The fill sheets 58 are aligned with the incoming air propelled by the fan 94 through a transition duct 96. It has been found that the horizontal distribution of air from such a fan 94 is improved if the fan shaft 98 is slightly elevated and the fan discharge aimed through a gradually flared transition duct 96 which expands to approximately the dimensions of the inlet side 28'' of plenum 36''. Another advantage of aligning the fill sheets 60'' with the forceful air streams from a centrifugal fan 94 is that the lower edges 64'' of the sheets have a lessened tendency to flutter and thereby air flow between the sheets is facilitated.

An example of a forced draft (centrifugal fan) counterflow cooling tower having exterior width and length dimension of 48×71¾ inches (exclusive of fan and entry duct) and height of 78¾ inches, containing seventy eight (78) trapezoidal fill sheets suspended lengthwise, can supply approximately 55.9 tons of cooling capacity by cooling 167.7 gallons of water per minute from 95° F. inlet to 85° F. discharge using 15670 cubic feet per minute of 78° F. ambient air supplied by a centrifugal fan driven with a five (5) horsepower motor. This is believed to represent a height reduction of eight (8) inches and a capacity increase of more than 7% over prior cooling towers containing the same number and total surface area of fill sheets. A further operating savings is obtained with the present invention in that by reducing the height of the cooling tower there is a reduction in the vertical distance that the warm water must be lifted to the water distribution pipes and nozzles with a consequent and significant saving of energy required to drive water pumps.

FIG. 4 illustrates an induced draft cooling tower provided with two air entry ways 28a and 28b at opposite walls 12'' of the cooling tower and two banks of fill sheets 10a and 10b above plenum spaces 36a and 36b. As is readily seen the cooling tower is generally symmetrical about a central vertical plane and parts corresponding to those described in connection with FIG. 1 are denominated by the same reference character with a double prime notation. It is also possible to construct a forced draft embodiment of a symmetrical unit similar to the induced draft embodiment of FIG. 3.

Further variations and modifications may be made without departing from the spirit and scope of the invention which is defined in the following claims:

What is claimed is:

1. An improved counterflow cooling water tower comprising:
   an enclosure having vertical walls including one wall with an air inlet in a lower portion thereof and a second wall opposite said one wall;
   a plurality of heat transfer media extending across said enclosure from about said one wall to about said second wall so as to form a plurality of parallel air passageways, said passageways being aligned with said air inlet and perpendicular to said one wall, each of said media having an upper extremity extending in a horizontal substantially straight line above said air inlet from about said one wall to said second wall, each of said media also having a lower extremity sloping downwardly in one direction from said one wall above said air inlet along a substantially continuous line to about said second wall whereby to define a plenum space inward of said air inlet, said plenum space having an interface with the lower extremity of said media which slopes continuously downwardly in one direction from said one wall to said second wall.

2. The counterflow cooling water tower of claim 1 wherein said media comprises sheets of fill.

3. The counterflow cooling tower of claim 2 wherein said sheets are of trapezoidal in shape.

4. The counterflow cooling tower of claim 1 wherein the said media comprises serpentine tubing.

5. The cooling tower of claim 1 wherein said media comprises fill sheets suspended vertically beneath water distributing means, said fill sheets having top edges extending horizontally and having continuous bottom edges that decline in substantially continuous lines at an angle from one elevation at said one wall to a lower second elevation near a bottom of said cooling tower.

6. The cooling tower of claim 5 wherein the bottom edges of adjacent fill sheets are staggered sufficiently to lessen the contact between water beads forming along said bottom edges.

7. The cooling water of claim 5 including a plurality of mist eliminator baffles located above said fill sheets and oriented to be substantially perpendicular thereto.

8. An improved method for moving air through a counterflow cooling tower, said method comprising:

forming an enclosure having vertical walls including one wall with an air inlet in a lower portion thereof and a second wall opposite said one wall;

placing heat transfer media within said enclosure to define a plenum space between said air inlet and said second wall, said media extending across said enclosure between said one wall and said second wall so as to form a plurality of parallel air passageways aligned with said air inlet and perpendicular to said one wall;

maintaining each of said media in a vertical altitude with an upper extremity extending in a horizontal substantially straight line between said one wall and said other wall and a lower extremity extending from said one wall above said air inlet along a substantially continuous downwardly sloped line to said second wall whereby said plenum space interface with said media slopes continuously downwardly in one direction from a top of said air inlet; and moving air horizontally into said plenum space through said air inlet toward said second wall and causing portions of the horizontally moving air to move upwardly through said passageways from points where said horizontally moving air reaches said interface whereby the vertical path and resistance to flow of air in said air passageways is increased as the horizontal distance from said one side is increased and thereby causing a relatively greater rate of vertical air flow near said one side.

9. The method of claim 8 wherein the entering air is forced to move horizontally in a manner tending to apply relatively greater force to air moving across the bottom of said plenum space.

10. The method of claim 8 wherein the media comprises fill sheets, each sheet having upper and lower edges which are non-parallel to one another and the lower edges of all fill sheets are inclined downwardly from said one side of said cooling tower, and including the step of forcing air from said one side into said plenum space and toward said interface.

* * * * *